July 27, 1965 W. E. ESPLIN 3,196,571
FISHING REEL
Filed Oct. 28, 1963 2 Sheets-Sheet 1

INVENTOR.
WILLIAM E. ESPLIN
BY
Christie, Parker & Hale
ATTORNEYS.

July 27, 1965
W. E. ESPLIN
3,196,571
FISHING REEL
Filed Oct. 28, 1963
2 Sheets-Sheet 2
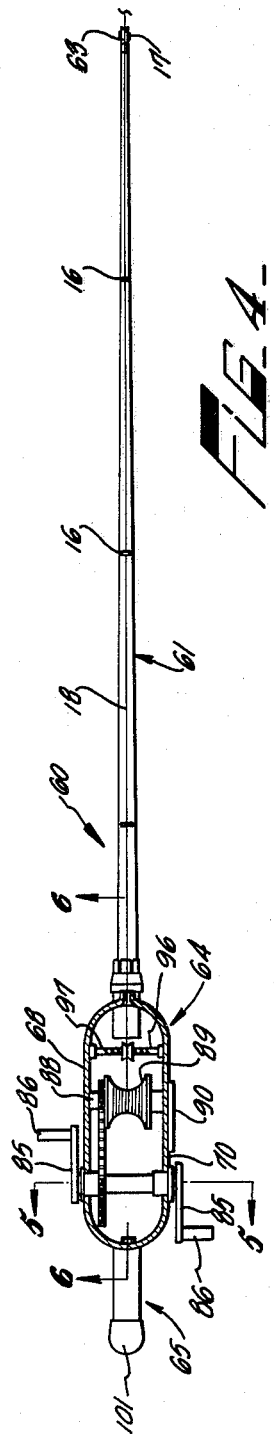
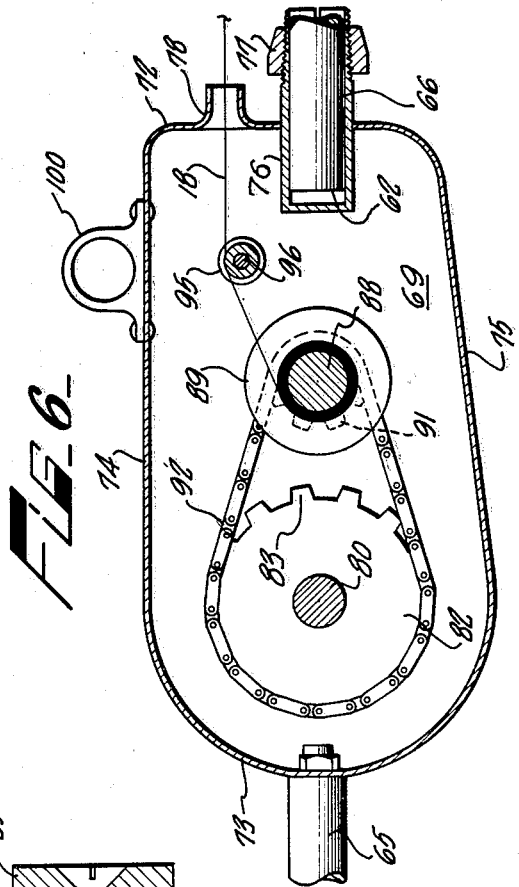
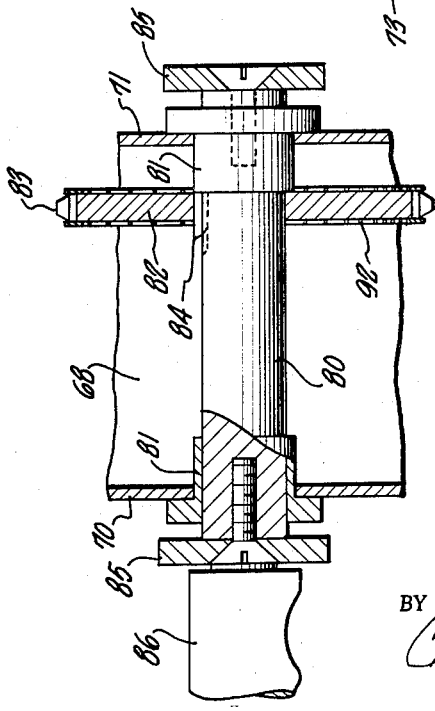
INVENTOR.
WILLIAM E. ESPLIN
BY
Christie, Parker & Hale
ATTORNEYS.

United States Patent Office 3,196,571
Patented July 27, 1965

3,196,571
FISHING REEL
William E. Esplin, 15445 Labrador St., Sepulveda, Calif.
Filed Oct. 28, 1963, Ser. No. 319,310
3 Claims. (Cl. 43—20)

This invention relates to fishing apparatus and, more particularly, to a fishing rod and reel combination for deep-water trolling and surf fishing.

In deep-trolling and surf fishing it is necessary for the fisherman to pay out a considerable amount of fishing line in order that the bait or lure be placed in the desired location. Once the lure is properly placed and a fish strikes the bait, additional line is reeled out as the fish runs with the bait. In salt water fishing, the fish generally are of considerable weight and, accordingly, the recovery procedure necessary to land the fish after it has taken the bait is a long and exhausting procedure. This is true because conventional reels for use in such fishing have a low mechanical advantage. As used herein the term "mechanical advantage" refers to the ratio of (1) the force which must be applied to the reel for rotation thereof to (2) the tension force present in the fishing line.

Conventional reels are usually constructed in a manner such that a fisherman cannot effectively apply his energy to the reel handles. This result follows from the fact that conventional reels usually have a short crank arm, or from the fact that the reel is placed close to the chest of the fisherman so that the fisherman's arms between the reel and the shoulder are bent with the result that the fisherman's muscles are not used most effectively.

This invention provides fishing apparatus which includes a fishing line reel having a high mechanical advantage. Further, the reel is located along the rod at a location spaced from the butt end of the rod such that a fisherman may effectively exert physical force upon the reel crank handles. From these features of the invention, it follows that the process of reeling in a fish which has taken a bait is speeded and the energy of the fisherman is conserved.

It is a further feature of the invention that the fishing apparatus lends itself to fabrication from commercially available materials. Accordingly, an existing heavy duty fishing pole may be equipped quite readily with an improved reel assembly according to this invention.

Generally speaking, the invention provides fishing apparatus which comprises, in combination, a fishing rod having a butt end and a tip end, a reel assembly, and a handle. The reel assembly includes a support frame which has an open central portion. Means are mounted to one end of the frame for releasably coupling the frame to the butt end of the fishing rod. The reel assembly also includes a spool adapted to carry a quantity of fishing line about its circumference, and an over-running clutch and brake means interconnecting the frame and the spool and rotatably mounting the spool in the central portion of the frame. The reel assembly also includes means for rotating the spool to reel in fishing line, such means being comprised of a pair of opposed cranks disposed on opposite sides of the frame and means operatively connecting the cranks to the spool for rotation of the spool in response to operation of at least one of the cranks. The handle is secured to the other end of the frame.

A second embodiment of the invention provides fishing apparatus which comprises, in combination, a fishing rod having a butt end, a reel assembly, means for securing the reel assembly to the rod, and a hardness adapted to be worn by a fisherman. The reel assembly includes a rotatable spool and a pair of manually engageable crank means connected to the spool axially thereof. The means for securing the reel assembly to the rod includes frame means for rotatably mounting the spool and means for releasably securing the frame means to the rod adjacent the rod butt end. The harness includes means adapted to receive the butt end of the fishing rod and means adapted for releasably connecting the hardness to the reel assembly.

The above-mentioned and other features of the present invention are more fully set forth in the following description and explanation of the invention taken in conjunction with the accompanying drawings, wherein:

FIGURE 4 is a top plan view in partial cross-section of a second embodiment of fishing apparatus according to the present invention;

FIGURE 5 is an enlarged cross-sectional elevation view taken along line 5—5 of FIGURE 4; and FIGURE 6 is a cross-sectional elevation view taken along line 6—6 of FIGURE 4.

Figure 1:
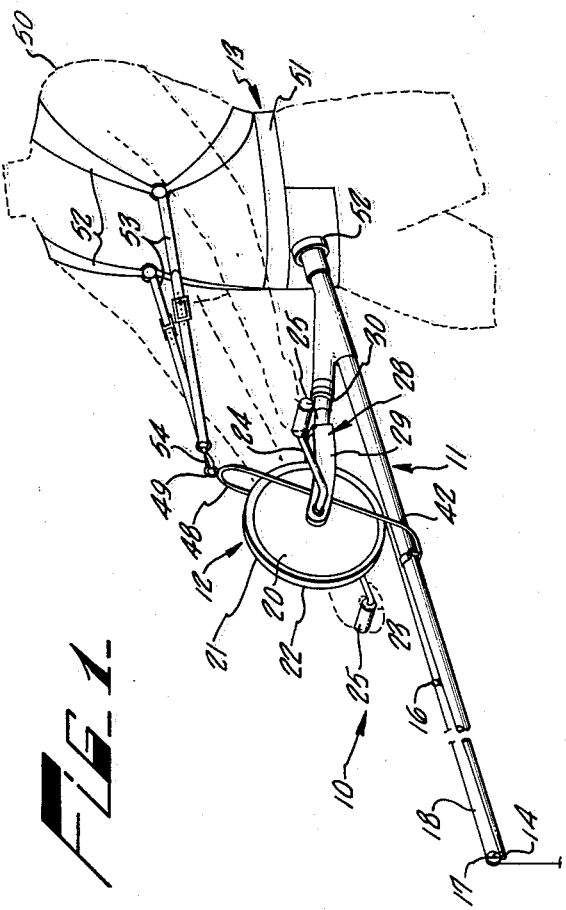
FIGURE 1 is a perspective view of fishing apparatus showing the apparatus operatively disposed relative to a fisherman, the body of the fisherman being shown in dashed lines.
Figure 2:
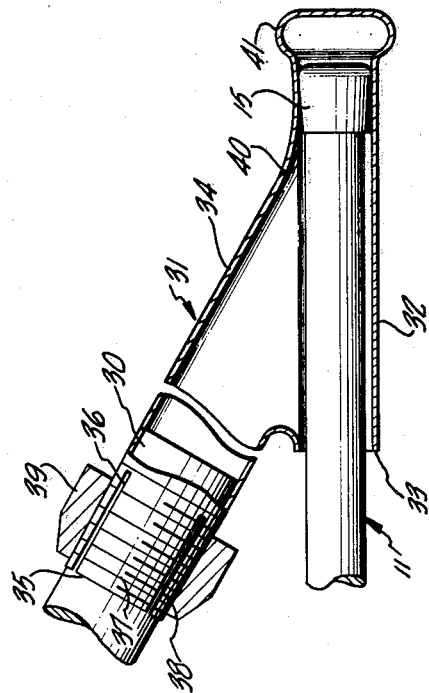
FIGURE 2 is an enlarged cross-sectional elevation view showing means located at the butt end of the fishing rod for securing the reel assembly to the rod.
Figure 3:
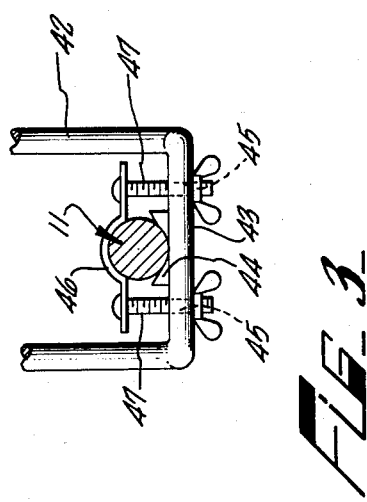
FIGURE 3 is an enlarged cross-sectional view showing further means for connecting together the reel assembly and fishing rod shown in FIGURE 1.

FIGURES 1, 2, and 3 show fishing apparatus 10 which includes an elongated tapered resilient fishing rod or pole 11, a reel assembly 12, and a harness 13. The rod has a tip end 14, a butt end 15 (see FIGURE 2), and a plurality of fishing line guides 16 secured at spaced apart locations along the rod. At the tip end of the rod a fishing line guide is provided in the form of a pulley 17 over which a line 18 runs from reel assembly 12.

Reel assembly 12 includes a spool member 20 having a peripheral rim 21 defining an outwardly open U-shaped or V-shaped groove 22 about the circumference of the spool. A pair of crank arms 23 and 24 are connected to the spool member axially thereof and extend in opposite directions from the axis on opposite sides of the spool member. A manually engageable rotatable handle 25 is secured to each crank arm at a location spaced from the axis of rotation of the spool member. The handles are equidistant from the spool axis and preferably are rotatable about axes disposed parallel to the spool axis.

A quantity of fishing line 18 is coiled about the circumference of the spool member in groove 22.

Fishing apparatus 10 includes means for securing the reel assembly to the pole. In the presently preferred embodiment of the invention illustrated in FIGURES 1, 2, and 3, such means include a fork member 28 having a bifurcated portion defining a pair of parallel spaced apart fork arms 29 (only one of which is shown), and a shank portion 30 which extends away from the bifurcated portion parallel to the elongate extent of the fork arms. Spool member 20 is rotatably mounted between the cantilevered or unsupported ends of fork arms 29 so that the axis of rotation of the spool member is disposed normal to the elongate extent of the fork member shank portion. Crank arms 23 and 24 are mounted opposite the respective fork arms from the spool member, as shown in FIGURE 1.

The means for securing the reel assembly to the pole also includes means for releasably securing the shank portion of the fork member relative to the pole adjacent the pole butt end. Accordingly, fishing apparatus 10 includes a socket member 31 which preferably is a hollow one-piece molding having a first straight tubular pole receptacle portion 32 having an open end 33, and a second tubular fork shank receptacle portion 34. The shank receptacle is connected to the pole receptacle and extends upwardly and away from the pole receptacle adjacent open end 33. The shank receptacle has an internal diameter which is slightly larger than the external diameter of fork member shank 30. The socket member shank receptacle has an end 35. A plurality of slots 36 are formed through the walls of the shank receptacle and communicate to end 35. The slots are spaced regularly about the circumference of the shank receptacle and extend a predetermined distance axially thereof to define a corresponding plurality of resilient cantilevered jaw fingers 37 between the slots. A tapering thread 38 is formed in the exterior surface of the shank receptacle adjacent the end thereof. An internally threaded clamping collar 39 is engaged with thread 38. When the collar is positioned adjacent end 35 of the shank receptacle, the fork member shank 30 may be inserted into the socket member as shown in FIGURE 2. With the shank so engaged with the socket member, clamping collar 38 is rotated so as to proceed away from the fork member to clamp the shank in the socket member by deflection of the cantilevered jaw fingers 37.

The socket member defines a substantially conical seat 40 in its interior at the end of the pole receptacle opposite open end 33 (see FIGURE 2). The conical seat is adapted to receive the butt end of fishing pole 11 which may be inserted into the socket member through the open end of the first tubular portion of the socket member.

An enlarged bulb portion 41, adapted to be seated in the fishing pole butt cup of a fishing harness, is defined by the socket member opposite seat 40 from pole receptacle open end 33.

The means for securing the reel assembly to the fishing pole also includes a bracket 42 which is secured to the fork member adjacent the axis of the spool member. As illustrated in FIGURES 1 and 3, the bracket preferably is a metal rod which is secured to the fork member adjacent the spool axis and which extends from the fork member on opposite sides of the spool member to a return-bend portion 43. The return-bend portion of the bracket is disposed under pole 11 so that the pole passes through the bracket below the spool member. A pole cushion 44, such as a block of sponge rubber, is secured to the upper side of the return-bend portion of the bracket to engage the underside of fishing pole 11. A pair of vertically oriented holes 45 are formed through the return-bend portion of the bracket adjacent the opposite ends of the pole cushion. A saddle clamp member 46 is engageable over the upper side of the fishing pole, as shown in FIGURE 3, and is movable toward or away from the return-bend portion of the bracket by operation by a pair of wing-nut and bolt assemblies 47 which are engaged between opposite ends of the saddle clamp member and the bracket by means of holes 45.

It is preferred that bracket member 42 extend beyond fork member 28 to a second return-bend portion 48, as shown in FIGURE 1. Accordingly, it is preferred that bracket 42 be fabricated in the form of an elongated loop having substantially parallel sides between which the spool member is disposed. A ring 49 is connected to the second return-bend portion 48 of the bracket above the spool member, as shown in FIGURE 1.

Fishing apparatus 10 also includes harness 13 adapted to be worn around the torso of a fisherman 50. The harness includes a belt 51 which carries a cup member 52 adapted to receive bulbed portion 41 of socket member 31. The harness also includes a pair of straps 52 which extend from the belt across the fisherman's shoulders to his back to be connected together either at the belt adjacent the small of the fisherman's back or between the fisherman's shoulder blades. In the latter case, a single strap extends from the junction of straps 52 to the belt adjacent the small of the fisherman's back. A pair of adjustable straps 53 are connected to straps 52 adjacent the fisherman's chest. Straps 53, at a location spaced from straps 52, carry means adapted for releasably securing straps 53 to ring 49 of the reel assembly and, as illustrated in FIGURE 1, such means comprise a snap link 54 connected to straps 53.

The reel assembly is secured to the fishing pole by engaging the shank or fork member 28 in the shank receptacle of socket member 31, as described above. The lower return-bend portion 43 of bracket 42 is secured in the manner described above to the pole at a location spaced from the socket member after the butt end of the fishing pole is engaged in the socket member.

It is preferred that reel assembly 12 be fabricated from the front wheel assembly of a tricycle. Accordingly, spool member 20 preferably is the front pedal wheel of a tricycle having the tire of the wheel removed so that fishing line 18 may be coiled in the groove circumferentially of the wheel, the groove normally receiving the tire. When a tricycle front wheel assembly is used for reel assembly 12, the pedal cranks of the wheel assembly are extended so that the distance from the axis of the spool member to handles 25 is greater than the radius of the wheel. Further, the foot pedals normally provided in a tricycle front wheel assembly are removed and are replaced by handles 25. Fork member 28 preferably is the front end fork from a tricycle and bracket 42 preferably is a fender bracket of the type commonly provided in tricycles.

The apparatus described above has a high mechanical advantage in that the radius of the spool is large and the radius of the cranks is even larger. Moreover, the reel is located at a convenient position relative to the shoulders of a fisherman so that the muscles in the fisherman's arms, shoulders and back may be used efficiently and effectively to effect rotation of the spool member. Those skilled in the art will recognize that the apparatus described has particular advantage in deep-water trolling and that such apparatus may be used for prolonged periods without causing undue exhaustion of the fisherman.

FIGURES 4, 5, and 6 illustrate a fishing apparatus 60 also in accord with the present invention. Fishing apparatus 60 includes an elongated tapered resilient fishing pole 61 having a butt end 62 and a tip end 63, a reel assembly 64 releasably engaged with the butt end of the pole, and a handle 65 connected to the reel assembly opposite from the pole. A plurality of fishing line guides 16 are secured to the pole at spaced apart locations along the pole to guide fishing line 18 from the reel assembly to the tip end of the pole. A small pulley 17 is secured to the tip end of the pole. As shown in FIGURE 6, adjacent its butt end, the pole defines a circularly cylindrical portion 66.

Reel assembly 64 includes a support frame 68 in the form of an elongated housing having an open central portion 69. The support frame has preferably parallel spaced apart sides 70 and 71 and spaced apart forward and rear end portions 72 and 73, respectively, which interconnect the frame sides. As illustrated in FIGURE 6, the support frame also has upper and lower walls 74 and 75 which enclose the open central portion of the frame.

Front end 72 of the frame carries a socket fitting 76 for releasably coupling the frame to the butt end of pole 61. The socket member is comprised of a cylindrical sleeve, the forward end of which, forwardly of the frame, is axially slotted and defines an external tapered thread with which an internally threaded clamping collar 77 is engageable. The forward end of sleeve 76 and collar 77 are structurally similar to the structure illustrated in FIGURE 2 at end 35 of socket member shank receptacle 34 and therefore the structure of sleeve 76 will not be described in further detail. The manner of operation of the coupling means as shown in FIGURE 6 is in accord with the operation of the structure described above and shown in FIGURE 2.

A fishing line guide aperture and bell 78 is formed in frame front end portion 72 above sleeve 76 to guide fishing line 18 to the line guides positioned along pole 61.

An axle shaft 80 is mounted in aligned bushings 81 engaged in the sidewalls of the support frame adjacent frame rear end portion 73. The bushings are disposed in the frame so that the axle is rotatably mounted between the frame sides and extends transversely of the frame central portion. A sprocket wheel 82, having chain sprocket teeth 83 disposed at regular intervals around its circumference, is secured to the axle, as by key 84, for rotation with the axle. A crank arm 85 is secured to each end of axle 80 exteriorly of frame 68 for rotation with the axle. As illustrated in FIGURE 4, the crank arms are disposed 180° out of phase with each other about the axis of rotation of the axle. A pair of manually engageable handles are rotatably connected one to each crank arm at locations spaced equidistantly from the axis of rotation of the axle. Preferably axle 80 and the sprocket wheel and crank arms secured thereto are a bicycle chain crank modified to the extent that the footpedals of the chain crank are replaced by handles 86.

A spool shaft 88 is supported between the frame sides at a location between axle 80 and frame front end 72 so that the shaft extends transversely of the frame central portion parallel to the axle. A fishing line spool 89 is disposed concentric to the spool shaft between the frame sides. An over-running clutch and coaster brake mechanism interconnects the spool shaft and the spool and mounts the spool between the frame sides for rotation about the spool shaft. The clutch and brake mechanism includes a torque arm 90 connected to the exterior surface of frame side 70 so that the torque arm is secured from rotation about shaft 88. A chain sprocket wheel 91 is connected to spool 89 and is aligned in the plane of sprocket wheel 82. Sprocket 91 has a diameter smaller than the diameter of sprocket wheel 82. A drive chain 92 is connected between sprocket wheels 83 and 91 for rotating the spool in response to rotation of axle 80.

The over-running clutch and coaster brake mechanism has the characteristic that when axle 80 is rotated counterclockwise (as seen in FIGURE 6), spool 89 also rotates in a counterclockwise direction. If, however, axle 80 is rotated in a clockwise direction, the clutch and brake mechanism operates to brake rotation of the spool. When axle 80 is stationary and no clockwise moment is applied thereto, spool 89 may run freely relative to shaft 88 to pay out fishing line 18 as when a bait or lure is cast. The clutch and brake mechanism, however, provides for the imposition of drag upon spool 89, the amount of drag so imposed on the spool being controllable by a fisherman using apparatus 60. If a small amount of force is applied clockwise of axle 80, the clutch and brake mechanism applies a braking force upon the spool but allows the spool to over-run relative to shaft 88 against this braking or drag force. If, however, a considerable clockwise moment is applied to axle 80, then spool 89 is securely locked from rotation relative to shaft 88. It is apparent therefore that the drag upon fishing line spool 89 is variable from zero to infinity at the control of a fisherman operating the reel assembly. In a preferred embodiment of the invention, shaft 88 is a bicycle rear axle and the reel spool is a modified bicycle rear wheel hub. The over-running clutch and brake mechanism preferably is a bicycle coaster brake mechanism. The coaster brakes manufactured by the New Departure and Bendix Corporations may be used to advantage in apparatus in accord with this invention.

A fishing line guide pulley 95 is rotatably carried by a shaft 96 which is mounted transversely of the frame open central portion between shaft 88 and fishing line guide bell 78. Preferably, the pulley is mounted so that its upper extent lies along a horizontal line intersecting the axis of line guide bell 78 above shaft 88. Guide pulley 95 is mounted to shaft 96 for oscillation transversely of support frame 68 in order to assure even coiling of fishing line upon spool 89. Accordingly, clockwise and counterclockwise helical grooves 97 (see FIGURE 4) are formed in the exterior surface of shaft 96. Such an oscillating mechanism is known in the art and therefore constitutes a part of this invention only in combination with the other apparatus disclosed.

In order that fishing apparatus 60 may be used with a fishing harness similar to the fishing harness 13 illustrated in FIGURE 1, support frame 68 includes means which are engageable with the snap rings of such a harness. Accordingly, a snap link engageable ring fitting 100 is secured to upper wall 74 of the support frame exteriorly of the frame. Also, it is preferred that the end of handle 65 remote from reel assembly 64 define a bulb 101 adapted for cooperation with a fishing pole socket cup, such as cup 52 shown in FIGURE 1, of a fishing harness.

Fishing apparatus 60 normally is used with a fishing harness like that described as a part of fishing apparatus 10. The apparatus of this invention therefore has the feature that the fisherman may use both hands to operate the reel with the result that the application of muscle power to the reel is more efficient than in apparatus in which the fisherman must use one hand to hold the rod while operating the reel.

While the invention has been described above in conjunction with specific apparatus and configurations and arrangements thereof, this has been by way of example only and is not to be considered as limiting the scope of this invention.

What is claimed is:
1. Fishing apparatus comprising, in combination,
  (a) a fishing pole having a butt end and a tip end,
  (b) a reel assembly including
    (1) a support frame having spaced apart end portions and defining a frame open central portion,
    (2) means mounted to one of the end portions for releasably coupling the frame to the butt end of the pole,
    (3) a spool adapted to carry a quantity of fishing line circumferentially thereof,
    (4) over-running clutch and brake means interconnecting the frame and spool and rotatably mounting the spool in the central portion of the frame, and
    (5) means for rotating the spool to reel in fishing line and including a pair of manually operated opposed cranks disposed on opposite sides of the frame and means operatively connecting the cranks to the spool for rotation of the spool in one direction to reel in fishing line in response to operation of at least one of the cranks in one direction and for operating the clutch and brake means to controllably oppose rotation of the spool in the opposite direction in response to operation of at least one of the cranks in the opposite direction, and
  (c) a handle secured to the other frame end portion and extending away from the frame.
2. Fishing apparatus comprising, in combination,
  (a) an elongated fishing pole having a butt end and a tip end,
  (b) a reel assembly including
    (1) a support frame having spaced apart end portions and defining a frame open central portion,
    (2) means mounted to one of the end portions for releasably coupling the frame to the butt end of the pole,

(3) a sprocket wheel rotatably carried by the frame and disposed in the frame open central portion,
(4) a pair of opposed manually engageable cranks disposed on opposite sides of the frame and connected to the sprocket wheel for rotation of the sprocket wheel,
(5) a spool shaft mounted to the frame between the sprocket wheel and the frame one end and extending transversely of the frame central portion,
(6) a spool adapted to carry a quantity of fishing line circumferentially thereof,
(7) a drive chain engaged between the spool and the sprocket wheel for imparting rotational motion to the spool in response to rotation of the sprocket wheel, and
(8) over-running clutch and brake means interconnecting the spool and spool shaft and mounting the spool for rotation about the spool shaft, said clutch and brake means being operable to rotate the spool about the spool shaft in one direction to reel in fishing line when the sprocket wheel is rotated in one direction and permitting the spool to rotate freely when the sprocket wheel is stationary, said clutch and brake means being operable to oppose rotation of the spool in the opposite direction in proportion to force applied to the sprocket wheel for rotating the sprocket wheel in the other direction, and
(c) a handle secured to the other frame end portion and extending away from the frame.
3. Fishing apparatus comprising, in combination,
(a) an elongated tapered resilient fishing pole having a butt end and a tip end,
(b) a reel assembly including
(1) a support frame having spaced apart sides and end portions interconnectiong the sides and arranged so that the frame has an open central portion,
(2) means mounted to one of the end portions for releasably coupling the frame to the butt end of the pole,
(3) an axle rotatably mounted between the frame sides and extending transversely of the frame central portion adjacent the other frame end portion,
(4) a sprocket wheel secured to the axle between the frame sides for rotation with the axle,
(5) crank means secured to each end of the axle exteriorly of the frame and disposed 180° out of phase with each other,
(6) a spool shaft mounted between the frame sides between the axle and the frame one end and extending transversely of the frame central portion,
(7) a fishing line spool disposed concentric to the spool shaft,
(8) fishing line guide means carried by the frame between the spool and the one frame end portion,
(9) a drive chain engaged between the spool and the sprocket wheel for imparting rotational motion to the spool in response to rotation of the sprocket wheel,
(10) over-running clutch and brake means interconnecting the spool and spool shaft and mounting the spool for rotation about the spool shaft, said clutch and brake means being operable to rotate the spool about the spool shaft in one direction to reel in fishing line when the sprocket wheel is rotated in one direction and permitting the spool to rotate freely when the sprocket wheel is stationary, said clutch and brake means being operable to oppose rotation of the spool in the opposite direction in proportion to force applied to the sprocket wheel for rotating the sprocket wheel in the other direction, and
(c) a handle secured to the other frame end portion and extending away from the frame substantially coaxially of the fishing pole.

References Cited by the Examiner

UNITED STATES PATENTS

| | | | |
|---|---|---|---|
| 335,797 | 2/86 | Dailey | 43—20 |
| 1,720,982 | 7/29 | Van Brunt. | |
| 1,742,645 | 1/30 | Brundage | 43—20 |
| 2,096,299 | 10/37 | Grieten. | |
| 2,226,295 | 12/40 | Lee | 43—24 |
| 2,251,782 | 8/41 | Coxe. | |
| 2,272,010 | 2/42 | Kerkam | 43—25 |
| 2,305,045 | 12/42 | Torrence. | |
| 3,049,829 | 8/62 | Clapp | 43—21.2 X |

FOREIGN PATENTS 94,142 6/59 Norway.

ABRAHAM G. STONE, *Primary Examiner.*